United States Patent
Nakatsuka

(10) Patent No.: US 10,018,826 B2
(45) Date of Patent: Jul. 10, 2018

(54) MICROSCOPE SYSTEM

(71) Applicant: OLYMPUS CORPORATION, Tokyo (JP)

(72) Inventor: Masayuki Nakatsuka, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/784,237

(22) Filed: Oct. 16, 2017

(65) Prior Publication Data

US 2018/0106992 A1 Apr. 19, 2018

(30) Foreign Application Priority Data

Oct. 19, 2016 (JP) .................................. 2016-205118

(51) Int. Cl.
    *G02B 21/36* (2006.01)

(52) U.S. Cl.
    CPC ......... *G02B 21/367* (2013.01); *G02B 21/362* (2013.01); *G02B 21/361* (2013.01); *G02B 21/368* (2013.01)

(58) Field of Classification Search
None
See application file for complete search history.

(56) References Cited

U.S. PATENT DOCUMENTS

2004/0047033 A1* 3/2004 Nakagawa ........... G02B 21/367
    359/368
2009/0087177 A1 4/2009 Uchida
2010/0171809 A1 7/2010 Fujiyoshi
2015/0138335 A1* 5/2015 Kaminaga ............ G02B 21/008
    348/80
2015/0339822 A1 11/2015 Onda et al.
2016/0187638 A1 6/2016 Miyoshi
2017/0161930 A1* 6/2017 Kakemizu ............... G06T 11/60
(Continued)

FOREIGN PATENT DOCUMENTS

EP     2 051 122 A1     4/2009
EP     2 947 623 A1    11/2015
(Continued)

OTHER PUBLICATIONS

Extended European Search Report dated Apr. 6, 2018 in European Patent Application No. 17 19 5110.6.

*Primary Examiner* — WB Perkey
(74) *Attorney, Agent, or Firm* — Scully, Scott, Murphy & Presser, P.C.

(57) ABSTRACT

A microscope system includes: a stage for placing a sample and movable in a direction; a position detecting unit that detects the stage position; an imaging unit that captures an image of the sample; an image generating unit that combines the acquired image based on the detected position; a position searching unit that searches for the position of an image on the generated combined image as the stage position; a switching detecting unit that detects switching of an optical member; and a control unit that corrects, when switching is detected, the stage position based on a difference between the stage position detected by the position detecting unit and the stage position searched by the position searching unit so that the stage position detected by the position detecting unit coincides with the stage position searched by the position searching unit.

8 Claims, 7 Drawing Sheets

(56) References Cited

U.S. PATENT DOCUMENTS

| | | | | |
|---|---|---|---|---|
| 2017/0205616 A1* | 7/2017 | Nakatsuka | ............ | G02B 21/365 |
| 2018/0067297 A1* | 3/2018 | Okabe | .................. | G02B 21/367 |
| 2018/0081162 A1* | 3/2018 | Abe | ..................... | G02B 21/367 |
| 2018/0088307 A1* | 3/2018 | Nakatsuka | ............ | G02B 21/367 |

FOREIGN PATENT DOCUMENTS

| JP | 2009086314 A | 4/2009 |
|---|---|---|
| JP | 2010134374 A | 6/2010 |
| JP | 2015-055849 A | 3/2015 |
| JP | 2015-221089 A | 12/2015 |

* cited by examiner

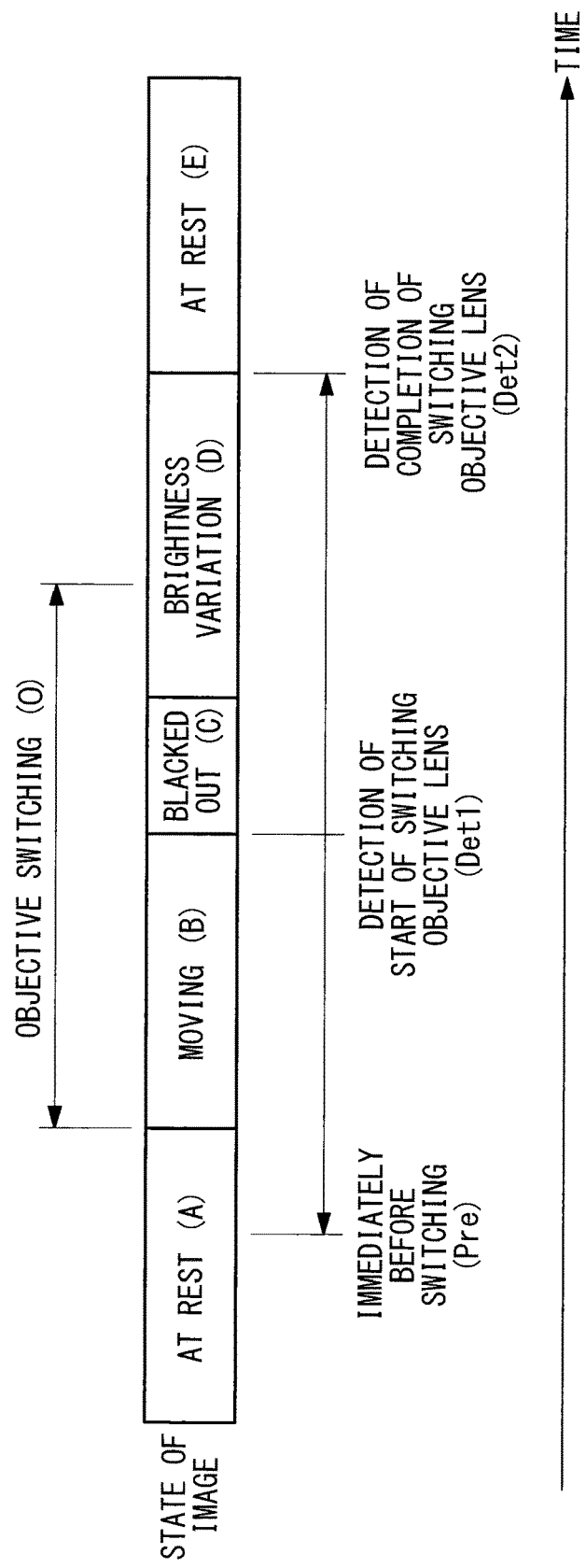

MICROSCOPE SYSTEM

CROSS-REFERENCE TO RELATED APPLICATIONS

This application is based on and claims priority to Japanese Patent Application No. 2016-205118 filed on Oct. 19, 2016, the entire content of which is incorporated herein by reference.

TECHNICAL FIELD

The present invention relates to microscope systems.

BACKGROUND ART

When a microscope is used to observe a sample, a visual field that is observable at one time is mainly determined by the magnification of an objective lens. A higher magnification of the objective lens allows observation of a more minute structure of the sample but with a narrowed observation range.

Observation of the entire structure of the sample is also needed at the same time. In a known microscope system, or a so-called virtual slide system, including an electric stage or an encoder-equipped stage, a plurality of images are acquired by repeating movement of the stage and image capturing. The acquired images are then patched and combined to generate a wide-field-angle combined image (refer to PTL 1, for example).

CITATION LIST

Patent Literature

{PTL 1}
Japanese Unexamined Patent Application, Publication No. 2010-134374

SUMMARY OF INVENTION

An aspect of the present invention provides a microscope system including: a stage on which a sample is placed and which is movable in a direction orthogonal to an observation optical axis; a position detecting unit configured to detect a stage position; an imaging unit configured to capture an image of the sample on the stage; an image generating unit configured to generate a combined image by patching and combining the image acquired by the imaging unit based on the stage position detected by the position detecting unit; a position searching unit configured to perform a position search of a predetermined position, as the stage position, on an image newly acquired by the imaging unit in the combined image generated by the image generating unit; a switching detecting unit configured to detect switching of optical members disposed on the observation optical axis in a switchable manner; and a control unit configured to calculate a difference between the stage position detected by the position detecting unit and the stage position searched by the position searching unit when the switching detecting unit has detected switching of the optical member, and correct, based on the calculated difference, the stage position detected by the position detecting unit after the calculation.

BRIEF DESCRIPTION OF DRAWINGS

FIG. 8 is a diagram for illustrating a process of searching for the stage position immediately before switching of an objective lens by referring to locus information according to the microscope system illustrated in FIG. 7.

DESCRIPTION OF EMBODIMENTS

The following describes a microscope system 1 according to a first embodiment of the present invention with reference to the accompanying drawings.

Figure 1:
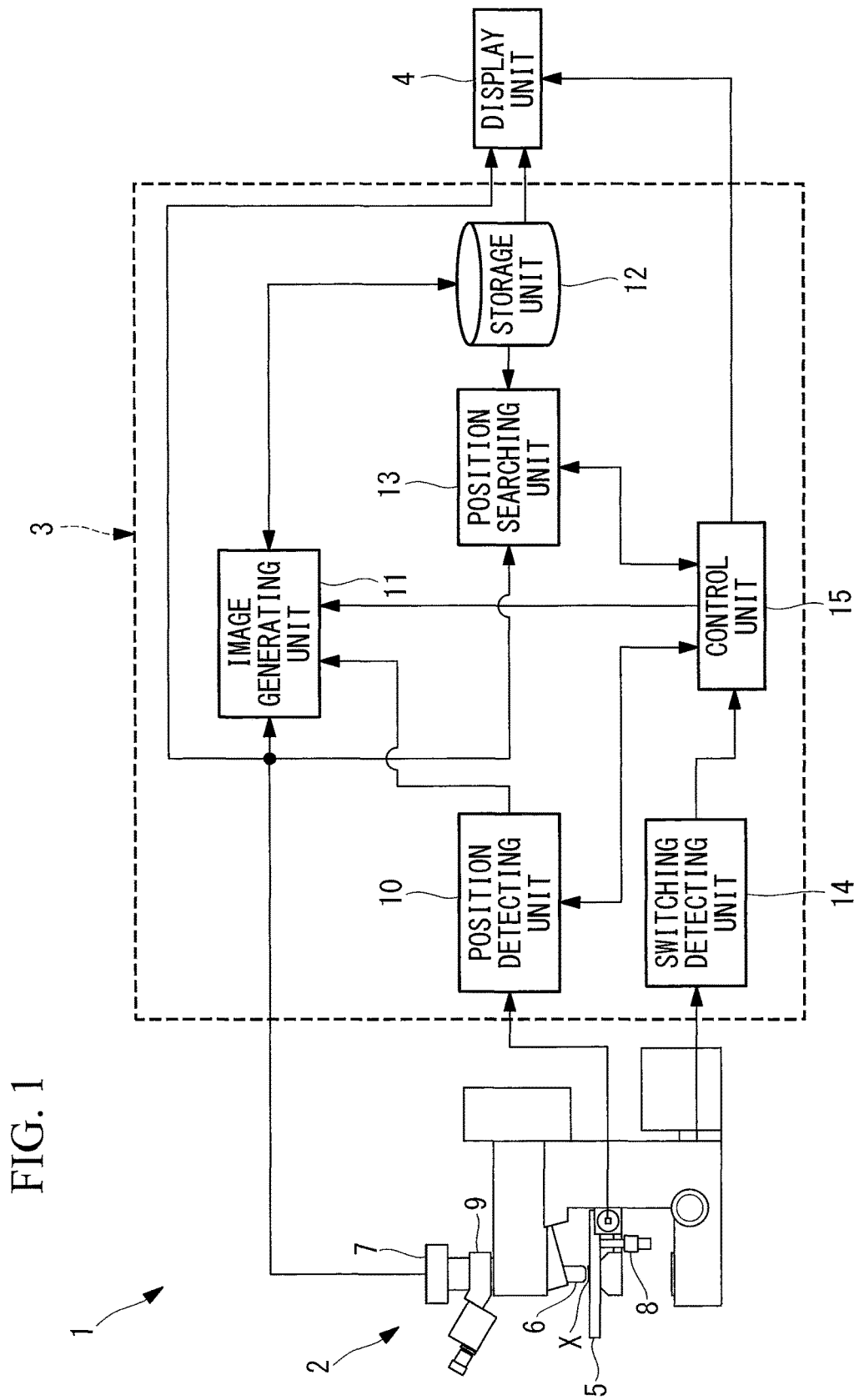
FIG. 1 is a block diagram illustrating a microscope system according to a first embodiment of the present invention.

As illustrated in FIG. 1, the microscope system 1 according to the present embodiment includes a microscope 2, an image processing unit 3 configured to process an image acquired by the microscope 2, and a display unit (for example, a liquid crystal display) 4 configured to display a combined image generated by the image processing unit 3 and a live image acquired by the microscope 2.

The microscope 2 includes a stage 5 capable of three-dimensionally moving a sample X placed thereon, an objective lens 6 and a trinocular tube (optical member) 9 disposed on an observation optical axis in the vertical direction, and a camera (imaging unit) 7 configured to capture an observation image of the sample X. The microscope 2 also includes an operable unit 8 to be operated by a user to manually move the stage 5 in two directions (horizontal directions) orthogonal to the observation optical axis, a position detecting unit 10 configured to detect the position of the stage 5 through an encoder, and a switching detecting unit 14 configured to detect switching of the optical path of the trinocular tube 9 through an encoder.

The camera 7 acquires a live image by acquiring an image of the sample X at a predetermined frame rate, and sends each frame image constituting the live image to the image processing unit 3. The live image is a moving image constituted of a plurality of sequential frame images for display.

The image processing unit 3 is a calculator, for example, a general-purpose personal computer, a workstation, a built-in processor, a field programmable gate array (FPGA), a digital signal processor (DSP), or a general-purpose computing graphic processing unit (GPGPU).

The image processing unit 3 includes an image generating unit 11 configured to generate a combined image by sequentially patching and combining images transferred from the camera 7, a storage unit 12 configured to store the combined image generated by the image generating unit 11, a position searching unit 13 configured to search for the position of an image provided from the camera 7 in the combined image stored in the storage unit 12, and a control unit 15 configured to control the display unit 4, the position detecting unit 10, the image generating unit 11, and the position searching unit 13.

The image processing unit 3 sends the live image provided from the camera 7, the combined image stored in the storage unit 12, and the stage position information to the display unit 4. The display unit 4 displays the live image and the combined image, and also displays, in the combined image, a rectangular frame indicating the stage position.

The image generating unit 11 generates, in response to a command from the control unit 15, a new combined image by patching and combining the image acquired from the camera 7 and the combined image stored in the storage unit 12 based on the stage position detected by the position detecting unit 10.

The storage unit 12 is an storage device, such as a memory, a HDD, or a SDD, configured to update the stored combined image upon reception of the new combined image from the image generating unit 11.

The position detecting unit 10 outputs, to the control unit 15, the stage positions (x, y) obtained from an encoder mounted on the stage 5 of the microscope 2. Optional correction values ($\delta x$, $\delta y$) can be provided to the position detecting unit 10 from the control unit 15, and the stage positions output by the position detecting unit 10 are (x+$\delta x$, y+$\delta y$) to which the correction values are added.

The position searching unit 13 executes position search in response to a command from the control unit 15. The position search of an image can be performed by searching for an image obtained from the camera 7 as a template on the combined image stored in the storage unit 12, by employing well-known technologies such as template-matching/block-matching using the sum of absolute difference (SAD) and normalized cross-correlation (NCC) as an evaluation function, or phase-only correlation (POC).

The switching detecting unit 14 detects start and completion of switching of the trinocular tube 9, and sends a result of the detection to the control unit 15. The present embodiment exemplarily describes a case in which switching of the optical path of the trinocular tube 9 is detected by a physical sensor mounted on the microscope 2, but the switching may be detected through, for example, a button operation or the like by the user before and after the switching.

An operation of the microscope system 1 according to this embodiment having the above-described configuration will be described below.

Figure 2:
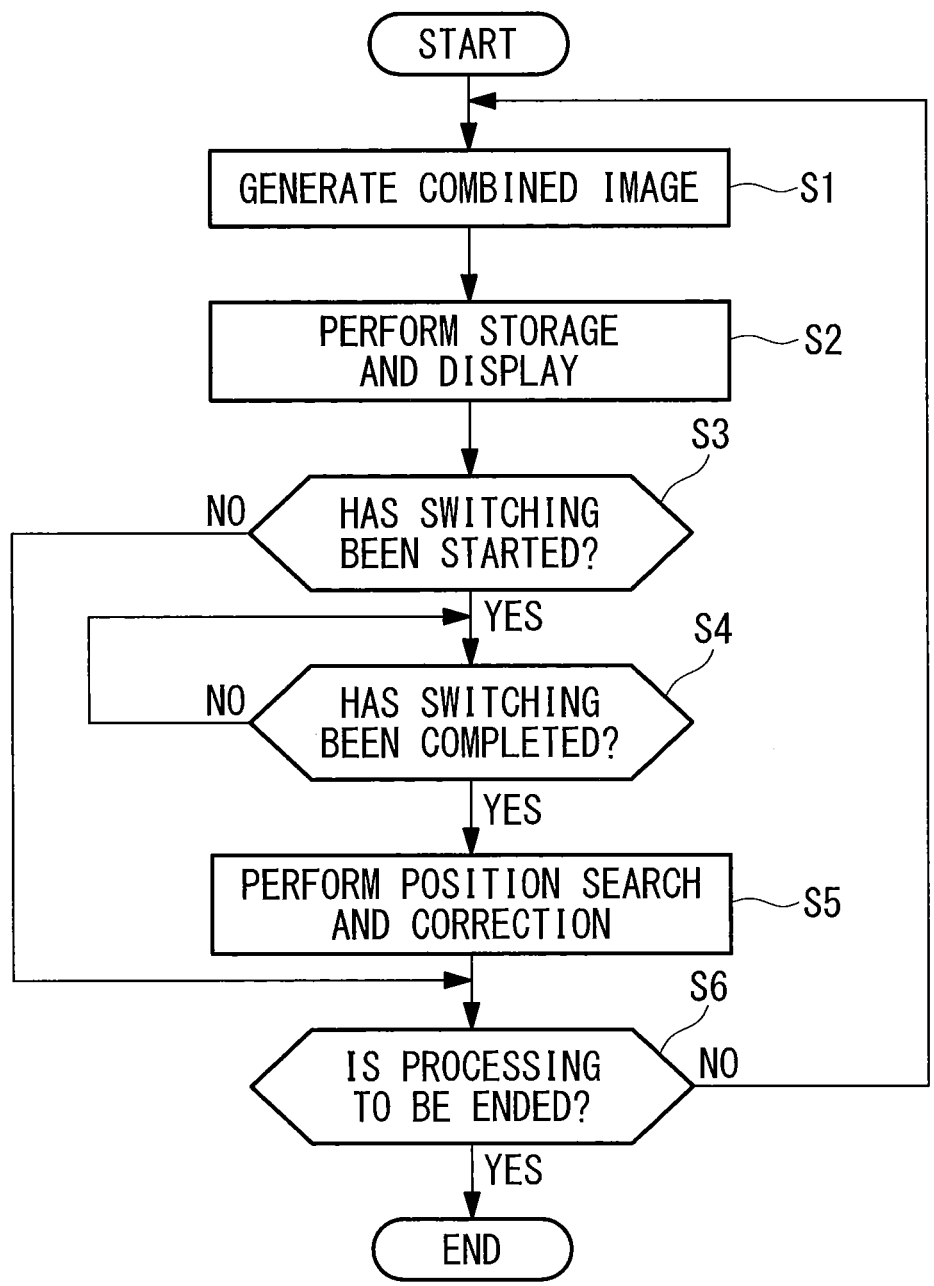
FIG. 2 is a flowchart for illustrating a process performed by the microscope system illustrated in FIG. 1.

As illustrated in FIG. 2, when patching and combining process is started to generate a combined image by using the microscope system 1 according to the present embodiment, initial observation images of the sample X provided from the camera 7 are then sent to the image generating unit 11, and the initial combined image M is generated (step S1). The generated combined image M is stored in the storage unit 12 and displayed on the display unit 4 (step S2).

Subsequently, the switching detecting unit 14 checks whether or not switching of the trinocular tube 9 (step S3) is started. If no start of switching is detected, whether to end the processing is determined (step S6). If the processing is to be continued, the processing start at step S1 is repeated.

If the start of switching of the trinocular tube 9 is detected at step S3, the system waits for completion of the switching (step S4).

If completion of the switching of the trinocular tube 9 is detected at step S4, the position searching unit 13 searches for the stage position (step S5).

The position search at step S5 will be described below with reference to FIGS. 3A and 3B.

Figure 3A:
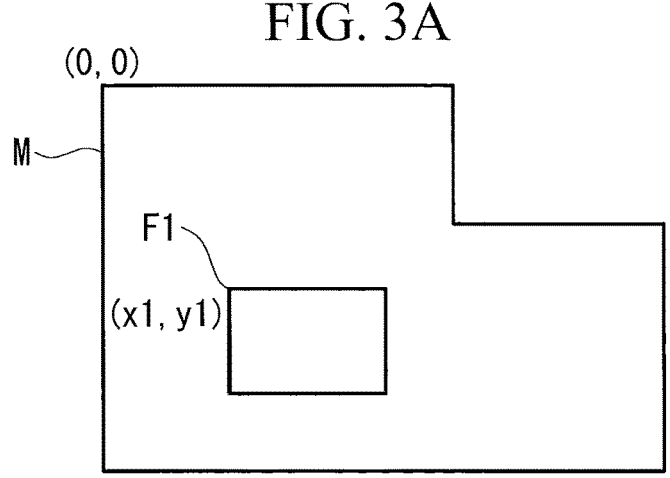
FIG. 3A is a diagram of a relation between a combined image generated in a modification of the microscope system illustrated in FIG. 1 and a stage position, illustrating a detected stage position.
Figure 3B:
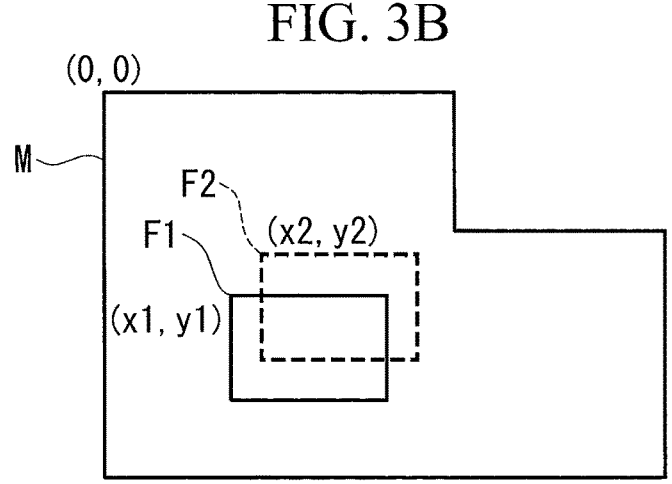
FIG. 3B is a diagram of a relation between a combined image generated in the modification of the microscope system illustrated in FIG. 1 and a stage position, illustrating a relation between the detected stage position and a searched stage position.

FIGS. 3A and 3B are each a diagram for illustrating a relation between the combined image M and the stage position. Reference signs F1 and F2 denote ranges observed by the camera 7, and the coordinates (x1, y1) of the observation range F1 correspond to the stage position output from the position detecting unit 10.

FIG. 3A illustrates a state before the switching of the trinocular tube 9.

FIG. 3B illustrates the relation between the combined image M and the stage position when the user switches the optical path of the trinocular tube 9 and a ratio of quantities of light incident on the camera 7 and an eyepiece is changed from the state illustrated in FIG. 3A.

The position of an image obtained from the camera 7 is shifted to F2 (x2, y2) upon the switching of the optical path of the trinocular tube 9. Combining the images with the position information F1 (x1, y1) from the position detecting unit 10 after the optical path switching causes shift of the combined image M, and no accurate combined image can be generated.

To avoid this, a difference ($\delta x$, $\delta y$)=(x2−x1, y2−y1) between the stage position F2 (x2, y2) searched by the position searching unit 13 and the stage position F1 (x1, y1) detected by the position detecting unit 10 is specified as a correction value to the position detecting unit 10. This allows the position detecting unit 10 to continue accurate patching and combining after the switching of the trinocular tube 9, without being affected by the image shift due to the trinocular tube 9.

The completion determination (step S6) of whether to end the patching and combining process is performed after step S3 or step S5, but the patching and combining process may be ended at a timing desired by the user.

Although the optical member detected by the switching detecting unit 14 is the trinocular tube 9 in the present embodiment, switching of any optical member (for example, an intermediate magnification variable device) other than the trinocular tube 9 may be detected.

Although the present embodiment exemplarily describes the case in which the camera 7 sends a live image to the image processing unit 3, still images may be sequentially captured and sent to the image processing unit 3.

Figure 4:
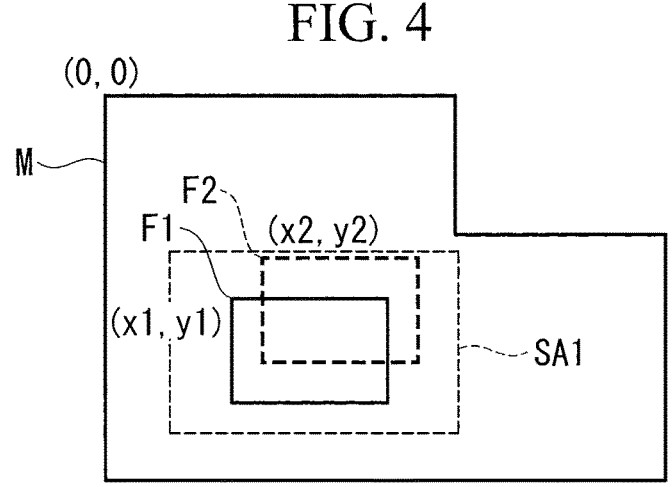
FIG. 4 is a diagram illustrating a relation between a combined image generated in another modification of the microscope system illustrated in FIG. 1 and a stage position.

The position search by the position searching unit 13 may be performed within a search range limited to a range SA1 which has a predetermined size and whose center is the stage position (x1, y1) output from the position detecting unit 10 as illustrated in FIG. 4.

In this way, a processing time taken for the position search by the position searching unit 13 is independent from the size of the combined image M so that the position search can be performed in a short time on the combined image M having a large size, thereby achieving an improved efficiency of combined image creation.

The following describes a microscope system 21 according to a second embodiment of the present invention with reference to the accompanying drawings.

In the description of the present embodiment, any component having a configuration common to that in the microscope system 1 according to the first embodiment described above is denoted by an identical reference sign, and description thereof will be omitted.

In the microscope system 21 according to the present embodiment, for example, the objective lens (optical member) 6 is switched instead of switching the trinocular tube 9. The switching of the objective lens 6 changes the magnification of an observation image, and thus it is necessary to configure a system that is able to continue patching and combining process even if the magnification changes.

Figure 5:
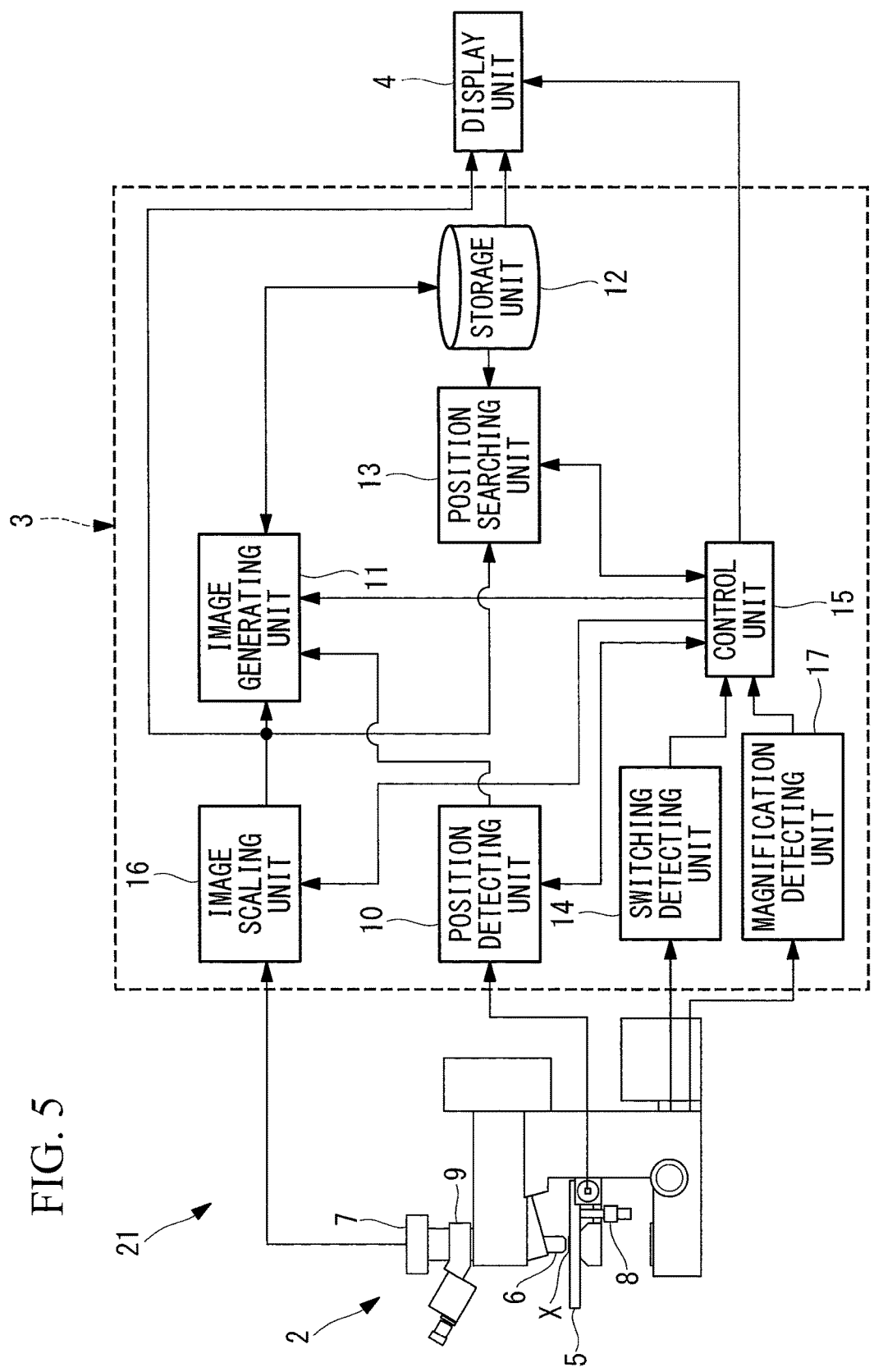
FIG. 5 is a block diagram illustrating a microscope system according to a second embodiment of the present invention.

As illustrated in FIG. 5, the microscope system 21 according to the present embodiment further includes a magnification detecting unit 17 configured to detect an optical magnification, and an image scaling unit 16 configured to scale an image acquired by the camera 7 at a predetermined magnification.

The magnification detecting unit 17 detects, through an encoder, a hole position of a revolver of the objective lens 6 inserted in an observation optical path, and detects the magnification of the objective lens 6 inserted in the observation optical path based on a correspondence relationship set in advance between the hole position and the magnification of the objective lens 6.

The image scaling unit 16 receives a specified magnification m from the control unit 15, and scales an image at the magnification m. The image scaling can be performed by a well-known interpolation method such as a bilinear method or a bicubic method.

The control unit 15 stores a magnification M1 of the objective lens 6 obtained from the magnification detecting unit 17 at start of creation of a combined image. The control unit 15 calculates the magnification (scaling magnification) m from m=M1/M2 where M2 represents the current magnification of the objective lens 6 obtained from the magnification detecting unit 17, and then sets the magnification to the image scaling unit 16.

Figure 6A:
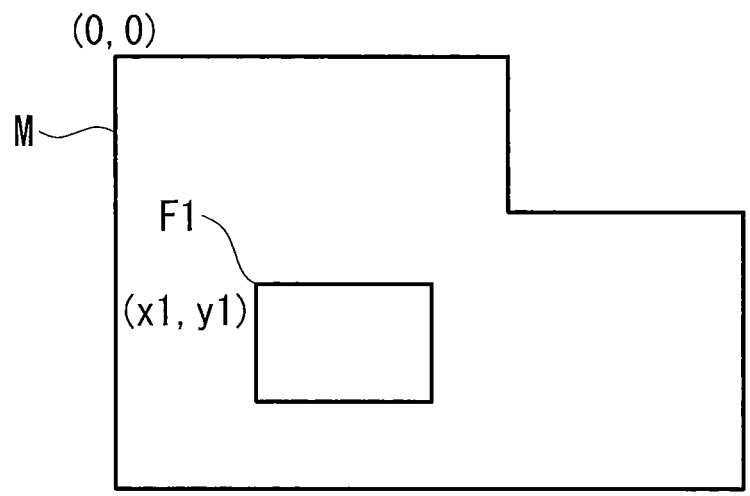
FIG. 6A is a diagram for showing a relation between a combined image generated by the microscope system illustrated in FIGS. 3A and 3B and the stage position, illustrating a detected stage position.
Figure 6B:
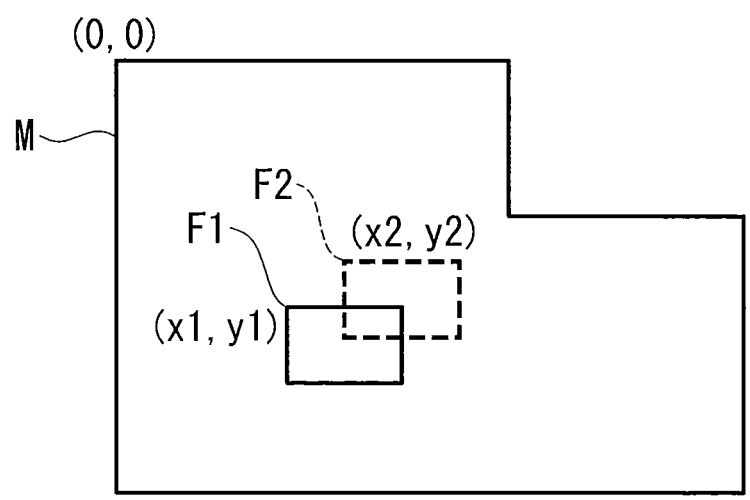
FIG. 6B is a diagram of a relation between a combined image generated by the microscope system illustrated in FIGS. 3A and 3B and a stage position, illustrating a relation between the detected stage position after magnification switching and the searched stage position.

FIGS. 6A and 6B are each for illustrating a relation between the combined image M obtained by the microscope system 21 and the stage position according to the present embodiment.

The following describes a case in which the magnification M1 of the objective lens 6 is set at M1=10 (10 times) at the start of creation of the combined image M and the combined image M being generated by moving the stage 5, which is the state of the stage position F1 shown in FIG. 6(*a*), and from which the user changes the magnification M2 of the objective lens 6 to M2=20 (20 times) (FIG. 6(*b*)).

When the switching detecting unit 14 detects that the user has ended the switching of the objective lens 6, the control unit 15 sets m=M1/M2=0.5 to the image scaling unit 16. The image scaling unit 16 scales an image obtained from the camera 7 by 0.5 times the image, in other words, halves the size of the image, and sends the scaled image to the image generating unit 11 and the position detecting unit 10.

The position searching unit 13 calculates the stage position F2 (x2, y2) by performing position search on the combined image M by using the image scaled down by the image scaling unit 16.

Thereafter, similarly to the above-described first embodiment, the correction value (δx, δy) is calculated and set to the position detecting unit 10 so that the image can be combined at a correct position after the switching of the objective lens 6.

Since the combined image is scaled at the image scaling unit 16 with an optical magnification taken into account, an accurate combined image can be continuously created when the optical magnification is changed during the combining process.

The following describes a microscope system 31 according to a third embodiment of the present invention with reference to the accompanying drawings.

In the description of the present embodiment, any component having a configuration common to that in the microscope system 1 according to the first embodiment described above is denoted by an identical reference sign, and description thereof will be omitted.

Figure 7:
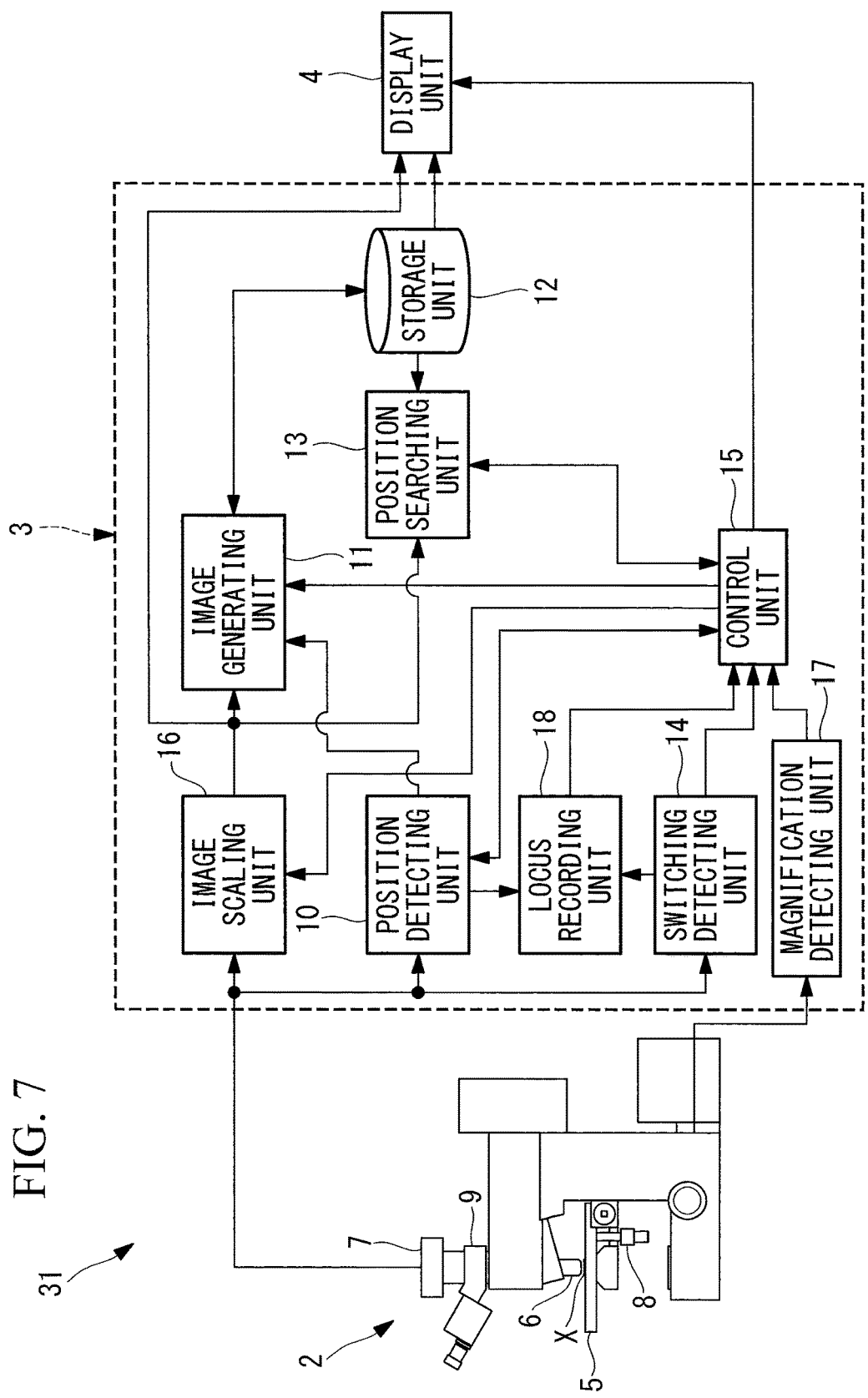
FIG. 7 is a block diagram illustrating a microscope system according to a third embodiment of the present invention.

The above-described embodiments exemplarily describe the cases in which the stage position and switching of the trinocular tube 9 are detected through the encoders provided in the microscope 2. In the present embodiment, instead, the stage position and switching of the objective lens (optical member) 6 are detected based on image information obtained from the camera 7 as illustrated in FIG. 7.

In the description of the present embodiment, any component having a configuration common to that in the microscope system 1 according to the first embodiment described above is denoted by an identical reference sign, and description thereof will be omitted.

In the present embodiment, the position detecting unit 10 calculates a movement amount between images sequentially acquired from the camera 7 and accumulates the movement amount to detect the stage position. The calculation of the movement amount between images can be performed by the above-described well-known technologies such as template-matching/block-matching and POC using SAD and NCC as evaluation functions.

In the description of the present embodiment, any component having a configuration common to that in the microscope system 1 according to the first embodiment described above is denoted by an identical reference sign, and description thereof will be omitted.

The switching detecting unit 14 employs, for example, a well-known method disclosed in Japanese Unexamined Patent Application, Publication No. 2009-86314 to detect switching of the objective lens 6 based on brightness change between images sequentially acquired from the camera 7. The brightness varies when a member supporting the objective lens 6 crosses the observation optical axis at insertion and removal of the objective lens 6 into and from the observation optical axis.

This brightness variation can be used to detect start of switching of the objective lens 6 when the brightness change between images that exceeds a predetermined first threshold value, and thereafter, detect completion of the switching of the objective lens 6 when the brightness change between images becomes a predetermined second threshold value or below.

In the present embodiment, the image processing unit 3 may further include a locus recording unit 18 storing the stage position detected by the position detecting unit 10 for each frame and the result of the detection by the switching detecting unit 14.

If the switching detecting unit 14 has detected completion of the switching of the objective lens 6, the control unit 15 searches for the stage position immediately before the switching of the objective lens 6 by referring to the information recorded in the locus recording unit 18. If the stage position immediately before the switching is found, the position searching unit 13 is controlled to perform the search with the search range limited to a range which has a predetermined size and whose center is the found stage position.

The following describes, with reference to FIG. 8, the process of searching for the stage position immediately before switching of the objective lens 6 by referring to the information recorded in the locus recording unit 18.

When the stage 5 is at rest immediately before switching of the objective lens 6, an image acquired by the camera 7 is at rest (A). When switching the objective lens 6, the revolver is turned and moves the observation image (B), and then, the observation optical path is blocked and the image is blacked out (C). When the next objective lens 6 is inserted into the observation optical axis, the brightness of the image is adjusted by automatic exposure control of the camera 7 so that the brightness is stabilized while variation (D). Thereafter, the image at rest is acquired (E).

The switching detecting unit 14 detects start of the switching (hereinafter referred to as objective lens switching) of the objective lens 6 (Det1) at the timing of the blackout, and detects completion of the objective lens switching at a timing when the brightness of the image becomes stabilized (Det2).

The control unit 15 searches for the timing (Det1) of the start of the objective lens switching by going back to the past from the timing (Det2), when the objective lens switching is completed, by referring to the information recorded in the locus recording unit 18 as illustrated in FIG. 8. The control unit 15 also searches for a timing (Pre) immediately before the objective lens switching, which is further back to the past.

The timing immediately before the switching can be detected at a timing when the movement amount of the stage 5 between frames recorded in the locus recording unit 18 becomes a predetermined threshold value or below. The stage position at this timing can be searched as the stage position immediately before the switching of the objective lens 6.

At detection of the stage position and switching of the objective lens 6 based on image information, the microscope system 31 according to the present embodiment can perform position search in a short time on the combined image M having a larger size, thereby achieving an improved efficiency of combined image creation.

The inventor has arrived at the following aspects of the present invention.

An aspect of the present invention provides a microscope system including: a stage on which a sample is placed and which is movable in a direction orthogonal to an observation optical axis; a position detecting unit configured to detect a stage position; an imaging unit configured to capture an image of the sample on the stage; an image generating unit configured to generate a combined image by patching and combining the image acquired by the imaging unit based on the stage position detected by the position detecting unit; a position searching unit configured to perform a position search of a predetermined position, as the stage position, on an image newly acquired by the imaging unit in the combined image generated by the image generating unit; a switching detecting unit configured to detect switching of optical members disposed on the observation optical axis in a switchable manner; and a control unit configured to calculate a difference between the stage position detected by the position detecting unit and the stage position searched by the position searching unit when the switching detecting unit has detected switching of the optical member, and correct, based on the calculated difference, the stage position detected by the position detecting unit after the calculation.

According to the present aspect, the sample is placed on the stage and an image of the sample is acquired through imaging by the imaging unit while the sample is moved on the stage in the direction orthogonal to the observation optical axis. Then, at each acquisition of the image of the sample, the image generating unit generates a combined image by pathcing and combining the acquired image based on the stage position detected by the position detecting unit.

In this case, when the optical member disposed on the observation optical axis is switched, the switching detecting unit detects the switching of the optical member. Upon the detection of the switching of the optical member by the switch detecting unit, the position searching unit searches for, as the stage position, a predetermined position of an image acquired by the imaging unit on the combined image, and the control unit calculates the difference between the stage position detected by the position detecting unit and the stage position searched by the position searching unit. Then, the control unit performs correction so that the stage position detected by the position detecting unit coincides with the stage position searched by the position searching unit.

Accordingly, creation of an appropriate combined image can be continued even when misalignment due to switching of the optical member during the creation of the combined image exists between before and after the switching.

In the above-described aspect, the position searching unit may limit a search range to a predetermined range whose center is a position immediately before switching the optical member.

By searching in the limited search range, it allows searching of the stage position to be performed in a short time.

In the above-described aspect, the control unit may stop patching and combining process by the image generating unit when the switching detecting unit detects start of switching of the optical member, and may resume the patching and combining process by the image generating unit when the switching detecting unit detects completion of the switching of the optical member.

In this manner, the patching and combining process is stopped during the switching of the optical member through which an image acquired by the imaging unit varies, thereby preventing generation of a combined image to which the varied image is combined. The patching and combining process is resumed after completion of the switching of the optical member is detected, which allows generation of an appropriate combined image.

In the above-described aspect, the microscope system may further include a magnification detecting unit configured to detect an optical magnification on the observation optical axis, and an image scaling unit configured to scale the image acquired by the imaging unit at a scaling magnification. The image generating unit may patch and combine the image scaled by the image scaling unit. The position searching unit may search for the image scaled by the image scaling unit on the combined image. The control unit may calculate the scaling magnification at the image scaling unit based on a ratio of magnifications of the optical members before and after switching, which are obtained from the magnification detecting unit.

In this manner, the magnification detecting unit detects the optical magnification on the observation optical axis when the optical member disposed on the observation optical axis is switched, and the image scaling unit scales an image acquired by the imaging unit at the scaling magnification calculated based magnification ratio before and after the switching. The image generating unit generates a combined image by patching and combining the scaled image, and the position searching unit searches for the scaled image on the combined image. Accordingly, an appropriate combined image can be generated even when the magnification varies due to the switching of the optical member on the observation optical axis.

In the above-described aspect, the imaging unit may acquire a plurality of the images at a predetermined frame rate, and the position detecting unit may calculate movement amounts between the images sequentially acquired by the imaging unit and accumulate the movement amounts to detect the stage position.

In this manner, the current stage position can be calculated based on the images acquired by the imaging unit, without using an electric stage or an encoder-equipped stage.

In the above-described aspect, the imaging unit may acquire a plurality of the images at a predetermined frame rate, and the switching detecting unit may detect switching of the optical member based on a brightness change between the images sequentially acquired by the imaging unit.

In this manner, switching of the optical member can be easily detected based on the brightness change between the images sequentially acquired by the imaging unit. Specifically, the image brightness once decreases and then increases again when a member supporting the optical member crosses the optical axis at the switching of the optical member. This brightness change pattern can be used to easily detect the switching of the optical member without using a dedicated sensor.

In the above-described aspect, the microscope system may further include a locus recording unit configured to record, for each frame, the stage position detected by the position detecting unit and a result of the detection by the switching detecting unit. The control unit may search for the stage position immediately before switching of the optical member based on information recorded by the locus recording unit and limits a range of search by the position searching unit to a range which has a predetermined size and whose center is the searched stage position.

In this manner, after switching of the optical member, the stage position immediately before the switching can be swiftly searched from the information recorded in the locus recording unit, and searching in the limited search range allows swift search of the stage position after the switching.

According to the aforementioned aspects, creation of an appropriate combined image can be continued even when an optical member is switched during the creation.

REFERENCE SIGNS LIST 1, 21, 31 microscope system
5 stage
6 objective lens (optical member)
7 camera (imaging unit)
9 trinocular tube (optical member)
10 position detecting unit
11 image generating unit
13 position searching unit
14 switching detecting unit
15 control unit
16 image scaling unit
17 magnification detecting unit
18 locus recording unit
M combined image
X sample

The invention claimed is:

1. A microscope system comprising:
a stage on which a sample is placed and which is movable in a direction orthogonal to an observation optical axis;
a position detecting unit configured to detect a stage position;
an imaging unit configured to capture an image of the sample on the stage;
an image generating unit configured to generate a combined image by patching and combining the image acquired by the imaging unit based on the stage position detected by the position detecting unit;
a position searching unit configured to perform a position search of a predetermined position, as the stage position, on an image newly acquired by the imaging unit in the combined image generated by the image generating unit;
a switching detecting unit configured to detect switching of optical members disposed on the observation optical axis in a switchable manner; and
a control unit configured to calculate a difference between the stage position detected by the position detecting unit and the stage position searched by the position searching unit when the switching detecting unit has detected switching of the optical member, and correct, based on the calculated difference, the stage position detected by the position detecting unit after the calculation.

2. The microscope system according to claim 1, wherein the position searching unit limits a search range to a predetermined range whose center is a position immediately before switching the optical member.

3. The microscope system according to claim 1, wherein the control unit stops patching and combining process by the image generating unit when the switching detecting unit detects start of switching of the optical member, and the control unit resumes the patching and combining process by the image generating unit when the switching detecting unit detects completion of the switching of the optical member.

4. The microscope system according to claim 1, further comprising:
a magnification detecting unit configured to detect an optical magnification on the observation optical axis; and
an image scaling unit configured to scale the image acquired by the imaging unit at a scaling magnification, wherein
the image generating unit patches and combines the image scaled by the image scaling unit,
the position searching unit searches for the image scaled by the image scaling unit on the combined image, and
the control unit calculates the scaling magnification at the image scaling unit based on a ratio of magnifications of the optical members before and after switching, which are obtained from the magnification detecting unit.

5. The microscope system according to claim 1, wherein the imaging unit acquires a plurality of the images at a predetermined frame rate, and
the position detecting unit calculates movement amounts between the images sequentially acquired by the imaging unit and accumulates the movement amounts to detect the stage position.

6. The microscope system according to claim 1, wherein the imaging unit acquires a plurality of the images at a predetermined frame rate, and
the switching detecting unit detects switching of the optical member based on a brightness change between the images sequentially acquired by the imaging unit.

7. The microscope system according to claim 1, further comprising a locus recording unit configured to record, for each frame, the stage position detected by the position detecting unit and a result of the detection by the switching detecting unit, wherein the control unit searches for the stage position immediately before switching of the optical member based on information recorded by the locus recording unit, and limits a range of search by the position searching unit to a range which has a predetermined size and whose center is the searched stage position.

8. A microscope system comprising:

a stage on which a sample is placed and which is movable in a direction orthogonal to an observation optical axis;

an imaging device which captures an image of the sample on the stage; and an image processing unit, the image processing unit is configured to conduct:

a position detecting process of detecting a stage position or receiving a detection result of the stage position;

an image generating process of generating a combined image by patching and combining the image acquired by the imaging device based on the stage position detected with the position detecting process;

a position searching process of performing a position search of a predetermined position, as the stage position, on an image newly acquired by the imaging device in the combined image generated with the image generating process;

a switching detecting process of detecting switching of optical members disposed on the observation optical axis in a switchable manner or receiving the detection result of the switching; and a correction process of calculating a difference between the stage position detected with the position detecting process and the stage position searched with the position searching process when the switching detecting process has detected switching of the optical member, and correcting, based on the calculated difference, the stage position detected or received with the position detecting process after the calculation.

* * * * *